(No Model.)
T. B. FAGAN.
STOCK HOLDER.
No. 316,763. Patented Apr. 28, 1885.
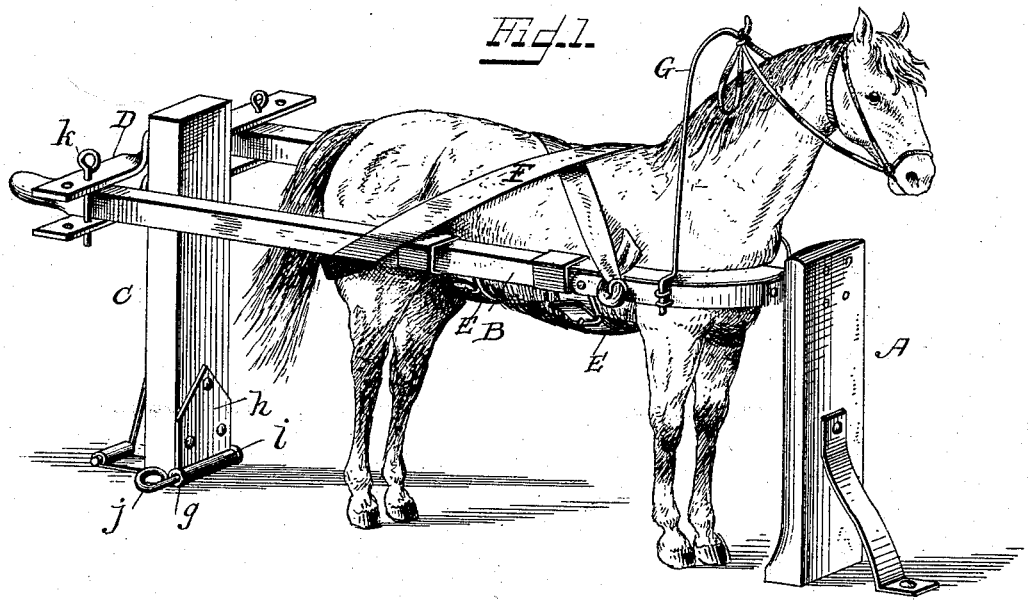
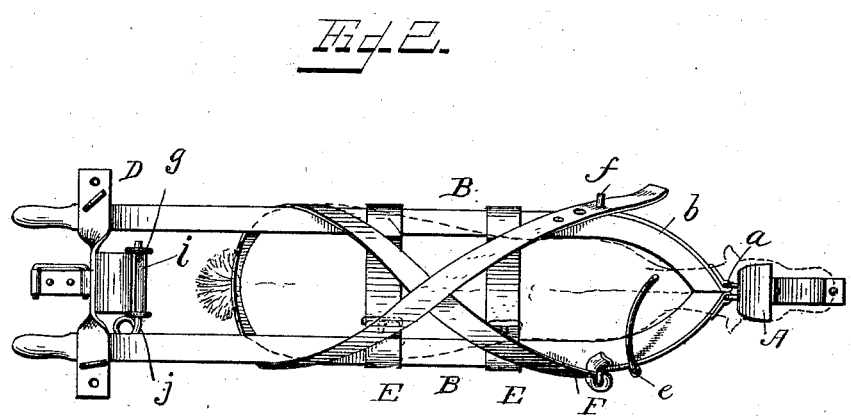
WITNESSES
F. L. Durand
E. W. Johnson
Thomas B. Fagan
INVENTOR
Attorney

United States Patent Office.

THOMAS B. FAGAN, OF VAN WERT, OHIO.

STOCK-HOLDER.

SPECIFICATION forming part of Letters Patent No. 316,763, dated April 28, 1885.

Application filed April 7, 1884. (No model.)

*To all whom it may concern:*

Be it known that I, THOMAS B. FAGAN, a citizen of the United States of America, residing at Van Wert, in the county of Van Wert and State of Ohio, have invented certain new and useful Improvements in Stock-Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to stock-holders; and it consists in the improvements, as will be hereinafter set forth, and pointed out in the claims.

In the accompanying drawings, Figure 1 is a perspective view illustrating my invention in use, and Fig. 2 is a plan view.

My invention is intended for use in blacksmith-shops, veterinary hospitals, and other like places, the object being to provide a means for holding animals, so that they cannot injure themselves or the person or persons performing operations upon them.

A represents a rigid post or standard, which is permanently secured to the floor, and is provided at its upper inner side with staples $a$, which engage with eyes formed upon the ends of metallic straps $b$, which are rigidly attached to curved bars B, as shown. Eyebolts $g$ are secured in the floor or base some distance from each other and at a proper distance from the standard A.

C is a standard, the lower portion of which has secured thereto a plate, $h$, a part of which is rolled to form an extended loop, $i$, adapted to be placed between the eyebolts $g$, and have a pivot, $j$, passed therethrough and through the eyes of the bolts $g$, to pivotally secure said standard to the base or floor.

D represents two horizontal perforated bars, each of which has a central portion twisted vertically, to adapt it for attachment to the outer face of the standard C, near its upper end, as shown most clearly in Fig. 1. The end portions of the bars D extend parallel with each other, as will be observed by reference to Fig. 1, to permit the bars B to be moved laterally, and for the insertion of their extremities between said bars D. A pin, $k$, is designed to pass through the perforations in the bars D and retain the extremities of the bars B between said bars D.

At suitable points the bars B have attached thereto straps or belly-bands E, which are provided with suitable buckles or adjusting means.

Near the forward end of one of the side bars, B, is attached a wide strap, F, which is of sufficient length to be passed over and around the animal and the bars B, as shown in Fig. 1, which strap is provided at its other end with perforations, one of which will engage with a securing device or pin, $f$, on the opposite bar B. One of the side bars, B, is provided at a suitable point near its front end with a socket, $e$, for the reception of an upwardly-projecting rod or bar, G, the upper end of the same being bent and provided with a hook, as shown, to which the reins or halter-strap may be attached.

When it is desired to secure an animal within the stock, the bands E are loosened, one of the pins $k$ removed, and the bar B held thereby swung laterally from between the bars D. The animal is then driven between the standards, after which the said bar B is moved between the bars D, and retained therein by restoring the pin $k$. The belly-bands are then fastened and a strap, F, wound over and around the horse and bars B and engaged by the pin $f$. The side bars may be adjusted laterally by means of pins, which pass through the perforations in the horizontal bars D.

When the stock is not in use, the pins $k$ may be withdrawn, the bars B moved laterally from between the bars D, and then swung on a vertical line with the post. By removing the pivot $j$ the standard C can be moved out of position.

By the means hereinbefore described I provide a means for securely holding animals which will, when not in use, occupy but little space.

I claim—

1. The combination of the support A, the side bars, B, curved at their front portions and hinged to said support, with a removable standard, provided with means, substantially as described, for adjusting and holding the extreme portions of the said bars B, and securing straps and band, substantially as set forth.

2. In a stock-holder, the side bars, B B, provided with supporting and adjusting means, substantially such as herein described, straps E F, and rod G, the parts being combined substantially as shown.

In testimony whereof I affix my signature in presence of two witnesses.

THOMAS B. FAGAN.

Witnesses:
A. T. DAILEY,
P. C. CORUTHERS.